A. C. ENGERT.
Improvement in the Manufacture of Moldings for Picture-Frames.
No. 126,385.
Patented May 7, 1872.
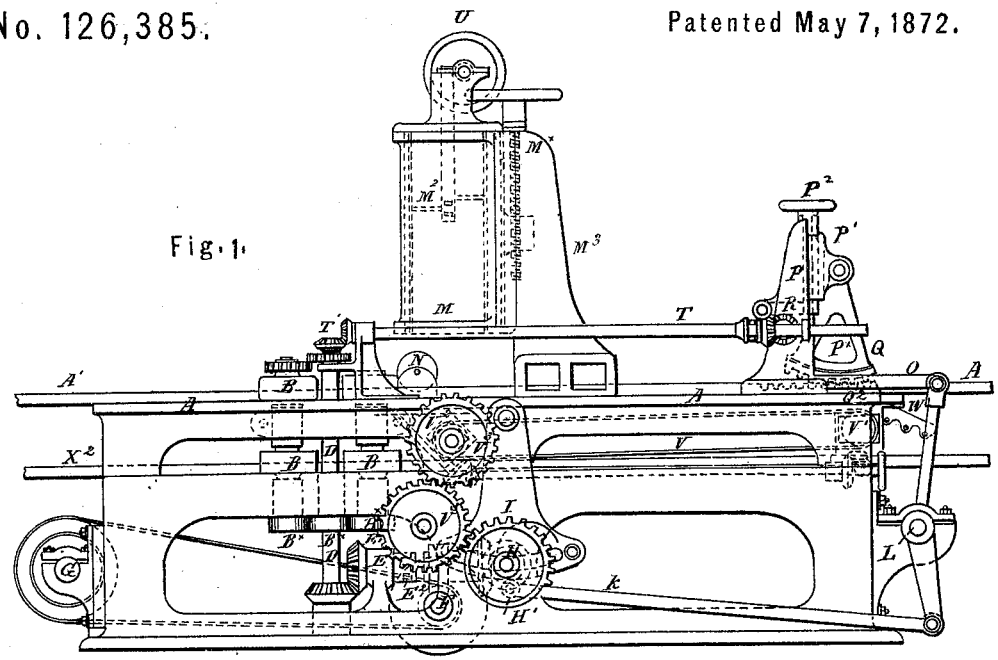
Fig. 1.
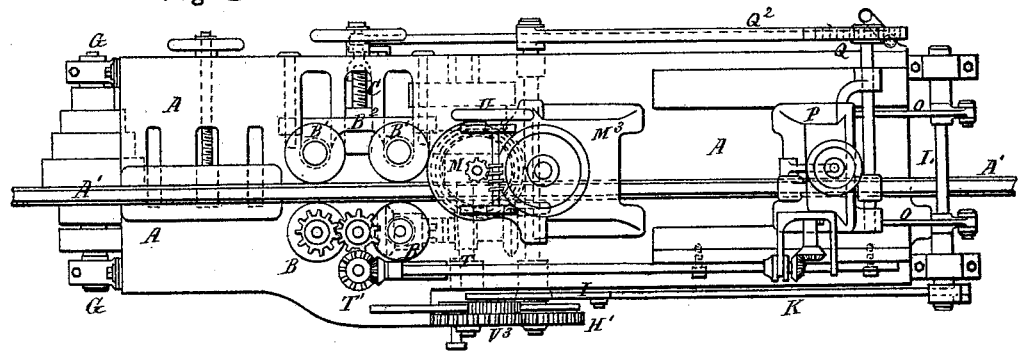
Fig. 2.
Fig. 4.
Fig. 5.
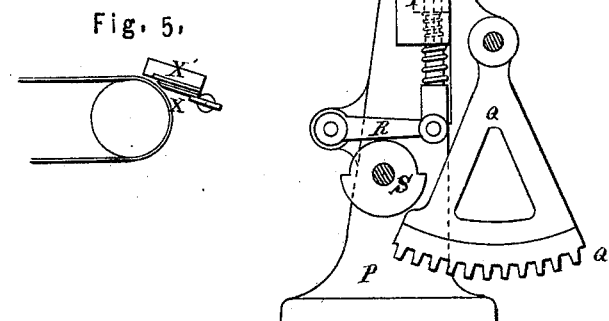
Fig. 3.
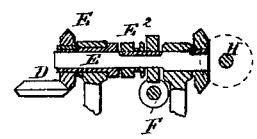
Witnesses
Geo: Pitt
Slurpunall
Inventor
A. C. Engert

126,385

UNITED STATES PATENT OFFICE.

ADAM CYRUS ENGERT, OF COUNTY OF MIDDLESEX, ENGLAND.

IMPROVEMENT IN THE MANUFACTURE OF MOLDINGS FOR PICTURE-FRAMES, &c.

Specification forming part of Letters Patent No. 126,385, dated May 7, 1872.

*To all to whom it may concern:*

Be it known that I, ADAM CYRUS ENGERT, of Nos. 31 and 32 Tabernacle Row, in the county of Middlesex, England, a subject of the Queen of Great Britain, have invented or discovered new and useful "Improvements in the Manufacture of Plain and Ornamental Moldings for Picture-Frames and other uses, and in apparatus therefor;" and I, the said ADAM CYRUS ENGERT, do hereby declare the nature of the said invention, and in what manner the same is to be performed, to be particularly described, and ascertained in and by the following statement thereof—that is to say:

This invention has for its object improvements in the manufacture of moldings for picture-frames and other uses, and in apparatus therefor.

The apparatus consists of a table fitted with rollers, capable of being regulated so as to gripe and push forward pieces of wood, suitably shaped and prepared with size or thin glue. Over the table is a cylinder or vessel heated by steam or water, and containing a plastic composition, such as is commonly used for making moldings. This composition is pressed out, by revolving blades within the cylinder or vessel, through an adjustable hole in its bottom, and in this way a roll of composition is produced of a size adapted to the molding which is to be made. This roll is laid on the surface of a wheel, which presses it down onto the surface of the prepared wood which is passing through the machine. The wood with the composition on its surface is moved on intermittently, and comes beneath a rocking arc or segment, on the periphery of which is a curved block, in which the pattern to be produced is engraved or sunk. While the wood with the composition upon it is stationary the arc or segment descends, bringing the pattern-block into contact with the composition, and then, by the motion of the arc or segment, the curved pattern-block is caused to roll along the composition, so that each part of the surface of the block, from end to end in succession, comes down onto the composition and molds it. The arc or segment then rises, lifting the block off the composition, and it moves back to be ready for the next operation. As the arc or segment returns, the wood with the composition upon it moves on, and afterward the curved pattern-block again descends and molds another length of the composition, and, as the motions are accurately adjusted, the pattern produced will be continuous or without break from end to end of the molding, whatever that length may be. Sometimes, in place of molding the composition while it is on the surface on which it is to remain, I mold it while it is upon an endless metal band, from which I then strip it and lay it onto the wood.

In order that my said invention may be most fully understood and readily carried into effect, I will proceed to describe the drawing hereunto annexed.

Description of the Drawing.

Figure 1 is a side view and, Fig. 2 is a plan of the machine.

A A is a table, on which is the piece of wood A' to make the molding; its surface is moistened with size or thin glue; it is held between the rollers B B B' B'. The rollers B' are covered with vulcanized India rubber or other elastic material, and they are adjustable by a screw, C, so that they can be made to press the wood against the rollers B whether the wood be narrower or wider. One of the rollers B is driven by means of a toothed wheel on its axis, gearing with a wheel on the vertical axis D, and there is a space on this wheel where there are no teeth, so that the roller B moves only at intervals. B$^\times$ B$^\times$ are toothed wheels gearing the rollers B together. When they move they carry the wood forward, and when they stop the wood is held stationary. The axis D is geared by beveled wheels with the axis E, as is more clearly shown at Fig. 3, and this axis is driven by a worm-wheel and worm, F, which takes its motion by a driving-belt passing round a pulley on its axis, and also around a pulley on the main axis G. The axis E, by beveled wheels, also drives the axis H, on which is a wheel, H', with teeth around a portion only of its periphery. A cam on the axis H works the rocking lever I, and the connecting-rod K transmits the motion to the axis L. M is the steam jacketed cylinder or vessel containing the composition. It is adjustable by the screw M$^\times$ to a convenient height, so that the composition, which is forced by the blades on the axis M² out through a hole of suitable size in the bottom of the cylinder or vessel, may be laid by the workmen onto the periphery of the roller N, which is hollowed to receive it. M³ is a standard fixed to the table A to carry the cylinder or vessel M. As the piece of wood A' passes beneath the roller N the composition is laid on its surface and pressed, so as to cause it to adhere, and the wood with the composition upon it then passes on to the point where the pattern is molded upon the composition. It will be seen that a connecting-rod, O, gives motion from the axis L to the standard P, Fig. 4, which moves to and fro in guides on the table A. P¹ is a slide on the standard P. It is adjustable by the screw and nut P². The slide P holds in bearings the axis of the arc or segment Q, the periphery of which is engraved with the pattern to be impressed on the composition; or a curved block with the pattern upon it is clamped in a groove in the periphery of the arc or segment. The pattern-block rolls over the composition and molds it when the standard P is moving from left to right, the composition, with the wood which it is upon, being at that time stationary. When the standard P returns, or moves from right to left, the arc or segment is lifted by the lever R and cam S, which cam is driven by a beveled pinion on its axis in gear with a pinion sliding on the axis T. T' are pinions which transmit motion to the axis T from the vertical axis D. U is a belt-pulley with a worm-wheel on its axis, driving a worm-wheel on the axis M². The arc or segment Q has a toothed quadrant, Q¹, on its axis, gearing with a rack, Q², and so a true rolling motion is communicated to the pattern-block. The rack Q² is able to rise and fall with the arc or segment Q, so that it always remains in gear with the quadrant Q¹. In some cases, in place of molding the composition when it is upon the surface of the wood A', the composition is laid by the roller N onto the surface of the endless steel band V, which is then brought up level with the surface of the table A. The band V passes around rollers V¹ and V², and it is strained tight between them. It receives an intermittent motion similar to that given to the wood A' by the rollers from the spur-wheels V³, gearing the axis of the roller V² with the spaced-wheel H' on the axis H. W W are small rollers, over which the molded composition passes when it is stripped from the surface of the band V by the scraper or knife X, Fig. 5. X¹ X¹ are knives, which trim the edges of the molded composition. When working in this way the wood is brought forward beneath the table A at X², and the workman lays the mold-composition upon it in its proper position. The glue or size causes it to adhere.

Having thus described the nature of my said invention and the manner of performing the same, I would have it understood that I claim—

1. The general combination or arrangement of machinery herein described and shown by the drawing.

2. Coating a strip of wood, either plain or shaped, with a composition suitable for producing the surface of either a plain or an ornamental molding by passing such strip, after it has been coated with size, glue, or other adhesive material, under a roller which is below the orifice of a heated cylinder containing the composition, and from which the composition is expressed, by blades or other mechanism, onto the surface of the roller, which in turn presses the composition onto the wood, substantially as described.

3. Employing rollers, as herein described, for feeding strips of wood past the orifice of the heated expressing-cylinder, substantially as described.

4. The employment, in combination with an apparatus for supplying a composition coating to a molding, of an engraved pattern capable of rocking or turning on an axis to impress a pattern on the surface of the coating composition, substantially as described.

5. The employment of an engraved pattern in the form of a segment of a circle, worked and operated substantially as herein described, for impressing a pattern on the surface of a molding.

6. The forming continuous strips of composition suitable for a molding by expressing a stream of composition onto an endless traveling-band, which carries it forward as it is expressed, substantially as described.

7. The supplying a stream of composition suitable for a molding onto an endless band or traveling-surface, and impressing a pattern onto such stream of composition while it rests on the traveling-surface, substantially as described.

8. The severing the stream of molded composition from the traveling-surface by a fixed scraper, and also the causing the stream to pass between two other scrapers to remove the surplus composition from the sides of the molded stream, substantially as described.

9. The receiving the stream of molded composition, as it leaves the endless band, onto a strip of wood coated with glue, size, or other cementing material to unite them to one another, substantially as described.

A. C. ENGERT.

Witnesses:
G. F. WARREN,
WILMER M. HARRIS,
*Both of No. 17 Gracechurch street, London.*